United States Patent

Kuroba et al.

[11] Patent Number: 6,081,990
[45] Date of Patent: *Jul. 4, 2000

[54] METHOD FOR INCORPORATING DISK MEDIA INTO MAGNETIC DISK DRIVE

[75] Inventors: Yasumasa Kuroba; Tomoyoshi Yamada; Toru Kohei; Shinji Koganezawa; Mitsuaki Yoshida; Hiroyuki Iwahara, all of Kawasaki, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/799,896

[22] Filed: Feb. 13, 1997

[30] Foreign Application Priority Data

May 31, 1996 [JP] Japan ................................. 8-139003

[51] Int. Cl.⁷ .................................................. G11B 5/127
[52] U.S. Cl. ......................................................... 29/603.01
[58] Field of Search .......................... 29/603.01; 360/75, 360/77.02

[56] References Cited

U.S. PATENT DOCUMENTS 5,130,870  7/1992  Jabbari .............................. 360/99.08
5,548,454  8/1996  Kawakubo et al. ................ 360/72.1

FOREIGN PATENT DOCUMENTS 373406    3/1991  Japan .
3154274   7/1991  Japan .
668444    3/1994  Japan .

Primary Examiner—David A. Scherbel
Assistant Examiner—Benjamin Halpern
Attorney, Agent, or Firm—Greer, Burns & Crain, Ltd.

[57] ABSTRACT

A method for incorporating a disk medium into a magnetic disk drive, in which the rotation center of the disk medium when a servo track information is written onto the disk medium (STW) coincides with the rotation center thereof when the disk medium is incorporated into the disk apparatus. A reference marker is provided as a positioning reference on a part of the disk medium. The disk medium is incorporated into a STW apparatus so that STW is performed on the disk medium. The disk medium is also incorporated into the magnetic disk drive in such a manner that a distance from an axis of rotation center of the disk medium to the reference marker is the same as when the STW was performed onto the disk medium.

18 Claims, 9 Drawing Sheets

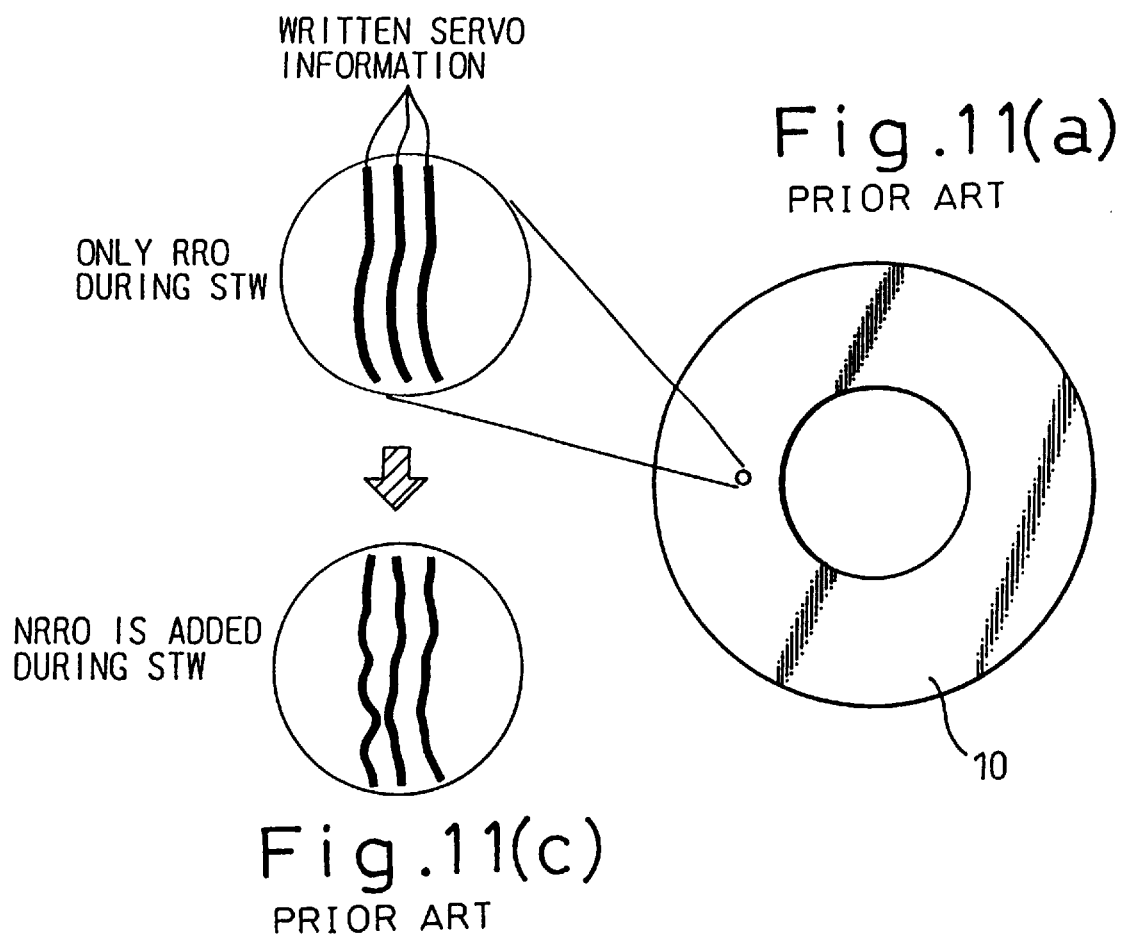

MAX. 50 μm BECAUSE DISK INNER DIAMETER TOLERANCE IS 50 μm (NOT INCLUDING SPINDLE HUB TOLERANCE)

METHOD FOR INCORPORATING DISK MEDIA INTO MAGNETIC DISK DRIVE

BACKGROUND OF THE INVENTION

1. Field of the Invention

The present invention relates to a method for incorporating disk media into a magnetic disk drive used as external storage for a computer or the like. Particularly, the present invention relates to a method for incorporating disk media into a magnetic disk drive after servo information has been written onto the disk medium for positioning a head of the magnetic disk drive at an aimed track in the disk medium.

2. Description of the Related Art

In the prior art, the operation for writing servo information onto a disk medium for positioning a head at an aimed track of a disk medium (hereinafter referred to as "servo track writing (STW) operation") is performed after the disk medium has been incorporated into the magnetic disk drive. In this regard, there is a problem in that a spindle and a head actuator may radially oscillate in the STW operation (hereinafter referred to as "runout (RO)"). This runout (RO) includes one occurring in synchronism with the rotation of the disk media (repeatable runout (RRO)) and another occurring independent from the rotation of the disk media (non-repeatable runout (NRRO)). Among them, the NRRO is particularly serious when the track density becomes higher.

FIG. 11 is an illustration for explaining the runout when the STW operation is being performed in the prior art. If the runout occurs when the servo information is being written onto the disk medium 10, the servo track information is written in a meandering manner in the radial direction. If the runout consists solely of the RRO, all the tracks are meandering while keeping the parallelism therebetween as shown in the upper left area of FIG. 11, which is no problem provided that the head could follow these tracks when data are written and read. However, if NRRO is added, the servo information is written while randomly deviated in the radial direction as shown in the lower left area of FIG. 11, whereby data are recorded based on the servo information written in such a deviated manner. When NRRO is significant in such a case, there might be interference between data in the adjacent tracks.

However, since there are limitations in cost, size and structure of the spindle and the head actuator incorporated into the device, it is impossible to design the device to completely minimize NRRO.

A ball bearing is often used as a bearing for a spindle motor to be incorporated into the device. One of primary factors for causing the NRRO in a ball bearing is a manufacturing accuracy of the parts thereof. Although it is, of course, possible to have high-accuracy parts, the manufacturing cost thereof is very expensive. A fluid bearing wherein a space between a stationary part and a rotary part is filled with fluid is recommended as a bearing capable of minimizing the NRRO. However, it is necessary for this purpose to increase the stiffness thereof by reducing the space between the stationary part and the rotary part or increasing the viscosity of the fluid, both resulting in an increase in working torque or loss torque.

Since a head actuator to be incorporated in a magnetic disk drive must move at a high speed on a disk medium to write and read data, mass and moment of inertia of a movable part of the head actuator should necessarily be as small as possible to be capable of high-speed running. However, if mass and moment of inertia become too small, the movable part is liable to be adversely affected by disturbance such as an air stream occurring when the disk medium rotates, resulting in oscillation.

Accordingly, the present invention relates to one which employs a system wherein the disk media are incorporated into the spindle of the magnetic disk drive after the servo information has been written onto an individual magnetic disk or a stack of magnetic disks. Such a system wherein the servo information is written onto a separate magnetic disk is disclosed in Japanese Unexamined Patent Publication (Kokai) No. 3-73406, as the title of "Servo Information Writing Method for in a Disk drive", which has its purpose to reduce a loss due to the inferiority of a magnetic disk medium or that of a driving system for rotating a magnetic disk drive to enhance the versatility of a device for writing a servo track information, so that a low cost magnetic disk drive is realized.

Thereby, it is possible to use, during the STW operation, a spindle having a minimum NRRO, for example, one incorporating a high-accuracy static pressure air bearing. Also, a head actuator for the STW operation is not necessarily driven at a high speed and thus may have a larger mass so as not to be influenced by a disturbance. Accordingly, it is possible to minimize the NRRO during the STW operation, whereby the servo track information can be written onto the disk medium at a higher track density.

FIGS. 12(a) and 12(b) illustrate an example of the conventionally known system wherein a disk medium is incorporated into a magnetic disk drive after the servo information has been written onto the disk medium. In FIG. 12(a), the servo information is being written, by a STW head actuator 13, onto a single disk medium 10 set on a STW spindle 11 by a clamper 12. On the other hand, in FIG. 12(b), a plurality of disk media 10 are being mounted on a spindle 15 secured to a housing 14 of a magnetic disk drive by a clamper 16.

The present invention may also be applicable to other systems for writing the servo information on the magnetic disk prior to the incorporation thereof into the disk drive than that described above. A system for forming a servo pattern by a magnetic layer includes one wherein the servo pattern is recorded by forming an irregularity on the magnetic layer (see Japanese Unexamined Patent Publication (Kokai) No. 6-68444 as a title of "Method and Apparatus for Writing Positioning Signals") and one wherein the servo pattern is recorded by pattern-etching the magnetic layer (see prior Patent Application No. 7-325320 filed by the same assignee of this application).

In a system wherein a single, separate disk medium is incorporated into the magnetic disk drive after the servo information is recorded onto the separate disk medium, it is important to match the rotational center of the disk medium during the STW operation with that of the disk medium during the incorporation thereof into the disk drive, or to match the center of servo pattern formation on the magnetic layer with that of the disk medium during the incorporation thereof into the disk drive.

FIG. 13 is the illustration for explaining a problem which may occur during the incorporation of the disk medium 10 into a spindle hub 15 of the disk drive.

For example, the track pitch would be 1.5 μm if one wishes to realize a high track density of 17,000 TPI (tracks per inch). Assuming that it would be possible to suppress a component of runout (RO) due to the rotation to a level of −40 dB or less by a servo control technique for a head, the RO due to a spindle motor must be at most ±3.75 μm for the purpose of suppressing the rotational component of RO due to the rotation of the spindle motor at a level of ±2.5% of the track pitch.

However, since a tolerance of an inner diameter of the disk medium would be 50 μm, if the disk medium 10 was incorporated into the spindle hub 15 without any special attention, the rotation center of the disk medium 10, when the STW is performed, would be deviated from that when the disk medium 10 is incorporated into the disk drive by 50 μm at maximum. Therefore, it should be considered that the RO is 50 μm at maximum. In addition, if the tolerance of the spindle hub 15 was included, the deviation would be even greater.

If the tolerance of the inner diameter of the disk medium 10 was reduced, the cost for making the disk medium 10 would significantly be increased. Therefore, it is impossible to further reduce the tolerance. Accordingly, in order to match the center of the disk medium when the servo track information is written onto the disk medium (STW) with the center thereof when the disk medium is incorporated into the disk apparatus as closely as possible, a method for incorporating the disk medium into the disk apparatus must be improved.

A method for forming servo patterns with a magnetic film has the same situation as mentioned above and, therefore, a similar improvement is required also for this case.

SUMMARY OF THE INVENTION

Accordingly, an object of the present invention is to provide a method for incorporating disk media into a magnetic disk drive, in which the rotation center of the disk medium, when servo track information is written onto the disk medium (STW), matches the rotation center thereof when the disk medium is incorporated into the disk apparatus, or the rotation center of the disk medium, when a servo pattern is formed with a magnetic film, matches the rotation center thereof, when the disk medium is incorporated into the disk apparatus, as closely as possible, to obtain a data recording apparatus with a high track density.

According to the present invention, there is provided a method for incorporating a disk medium into a magnetic disk drive after a servo track information has been written onto the disk medium for positioning a head of the magnetic disk drive at an aimed track in the disk medium, providing a reference marker as a positioning reference on a part of the disk medium; incorporating the disk medium into a servo track writing (STW) apparatus so that STW is performed on the disk medium; and incorporating the disk medium also into the magnetic disk drive in such a manner that a distance from an axis of rotation center of the disk medium to the reference marker is the same as when the STW has been performed on the disk medium.

At least one of the surfaces of the disk medium is almost entirely coated with medium material except for a part of the one surface of the disk medium, so that the part on the one surface which is distinct from the other area on the one surface is defined as the reference marker.

The disk medium is provided with an aperture or a groove which is defined as the reference marker.

Both the STW apparatus and the magnetic disk drive have respective spindle hubs, the disk medium is incorporated into the STW apparatus and also into the magnetic disk drive in such a manner that an inner periphery of the disk medium comes into contact with respective outer peripheries of the spindle hubs, so that the distance from an axis of rotation center of the disk medium to the reference marker is the same for both in the STW apparatus and in the magnetic disk drive.

In this case, a balance weight is added to or removed from the disk medium at a position on a surface passing through a contact position with respect to the respective spindle hubs and a rotation axis of the spindle hub.

The respective spindle hubs of both the STW apparatus and the magnetic disk drive have same circular cross-sections, the respective circular cross-sections are cut by straight lines or curves having a radius larger than a radius of the circular cross-sections to form cut portions, the disk medium is incorporated into the STW apparatus and also into the magnetic disk drive in such a manner that an inner periphery of the disk medium comes into contact with respective outer peripheries of the spindle hubs at two positions corresponding to respective ends of the cut portions.

Both the STW apparatus and the magnetic disk drive have respective spindle hubs, the disk medium is incorporated into the STW apparatus and also into the magnetic disk drive in such a manner that an inner periphery of the disk medium comes into contact with respective outer peripheries of the spindle hubs by means of a spacer, so that the distance from an axis of rotation center of the disk medium to the reference marker is the same for both in the STW apparatus and the magnetic disk drive. In this case, a balance weight is added to or removed from the disk medium at a position on a surface passing through a contact position with respect to the respective spindle hubs and a rotation axis of the spindle hub. The inner periphery of the disk medium comes into contact with respective outer peripheries of the spindle hubs by means of two spacers spaced in the circumferential direction.

After the inner periphery of the disk medium comes into contact with respective outer peripheries of the spindle hubs by means of the spacer so that the disk medium is positioned, the spacer is removed in the axial directions of the spindle hubs and then the disk medium is secured to the spindle hubs by means of clamps means. Contact surfaces between the spacer and the spindle hubs are tapered so that the spacer can easily be removed in the axial directions of the spindle hubs.

Both the STW apparatus and the magnetic disk drive have respective spindle hubs, the disk medium is incorporated into the STW apparatus and also into the magnetic disk drive in such a manner that an outer periphery of the disk medium comes into contact with a jig member which has a portion being in contact with the respective outer peripheries of the spindle hubs, so that the distance from an axis of rotation center of the disk medium to the reference marker is the same for both in the STW apparatus and in the magnetic disk drive.

According to another aspect of the present invention, there is provided a method for incorporating a disk medium into a magnetic disk drive after servo track information has been written onto the disk medium for positioning a head of the magnetic disk drive at an aimed track in the disk medium, providing a spacer having an inner diameter which can be fitted to spindle hubs of both a servo track writing (STW) apparatus and the magnetic disk drive and defining a gap between an adjacent disk medium; attaching the spacer to an inner peripheral edge of the disk medium; and attaching the spacer to the spindle hub so that the inner diameter of the spacer is fitted to an outer diameter of the spindle hub, in such a manner that the position of the disk medium with respect to the spindle hub is the same when the disk medium is incorporated into the STW apparatus and when it is incorporated into the magnetic disk drive. In this case, a reference marker is not necessary.

According to still another aspect of the present invention, there is provided a method for incorporating a plurality of stacked disk media into a magnetic disk drive after a servo track information has been written onto the plurality of stacked disk media for positioning heads of the magnetic disk drive at aimed tracks in the disk media, providing a reference marker as a positioning reference on a part of at least one of the plurality of stacked disk media; incorporating the stacked disk media into a servo track writing (STW) apparatus so that STW is performed on the disk media; and incorporating the stacked disk media also into the magnetic disk drive in such a manner that a distance from an axis of rotation center of the disk media to the reference marker is the same as when the STW has been performed on the disk media.

In this case, both the STW apparatus and the magnetic disk drive have respective spindle hubs, the stacked disk media are incorporated into the STW apparatus and also into the magnetic disk drive in such a manner that inner peripheries of the stacked disk media come into contact with respective outer peripheries of the spindle hubs by means of two spacers spaced in the circumferential direction.

After the inner peripheries of the stacked disk media come into contact with respective outer peripheries of the spindle hubs by means of the two spacers so that the stacked disk media are positioned, the spacers are removed in axial directions of the spindle hubs and then the stacked disk media are secured to the spindle hubs by means of clamp means. The contact surfaces between the spacers and the spindle hubs are tapered so that the spacers can easily be removed in the axial directions of the spindle hubs.

BRIEF DESCRIPTION OF THE DRAWINGS

FIGS. 3(a) and 3(b) are cross-sectional views of a third embodiment of this invention, wherein FIG. 3(a) shows an example providing with a hole and 3(b) shows another example providing with a groove;

FIGS. 7(a) and 7(b) show a sixth embodiment of this invention, wherein FIG. 7(a) shows an example of a hub having a straight cut portion and 7(b) shows another example of a hub having a R (round)-shaped cut portion;

FIGS. 8(a)–8(d) show a seventh embodiment of this invention, wherein FIG. 8(a) is a plan view, FIG. 8(b) is an enlarged cross-section of a portion indicated by F, FIG. 8(c) is a G—G sectional view, and FIG. 8(d) is a horizontal cross-section of a modification of the seventh embodiment;

FIGS. 9(a) and 9(b) show a eighth embodiment of this invention, wherein FIG. 9(a) shows an H—H sectional view of FIG. 9(b), and FIG. 9(b) is an axial sectional view;

FIG. 11 is schematic illustration for explaining problems when servo track information is written onto a disk medium;

DETAILED DESCRIPTION OF THE PREFERRED EMBODIMENTS

Figure 1A:
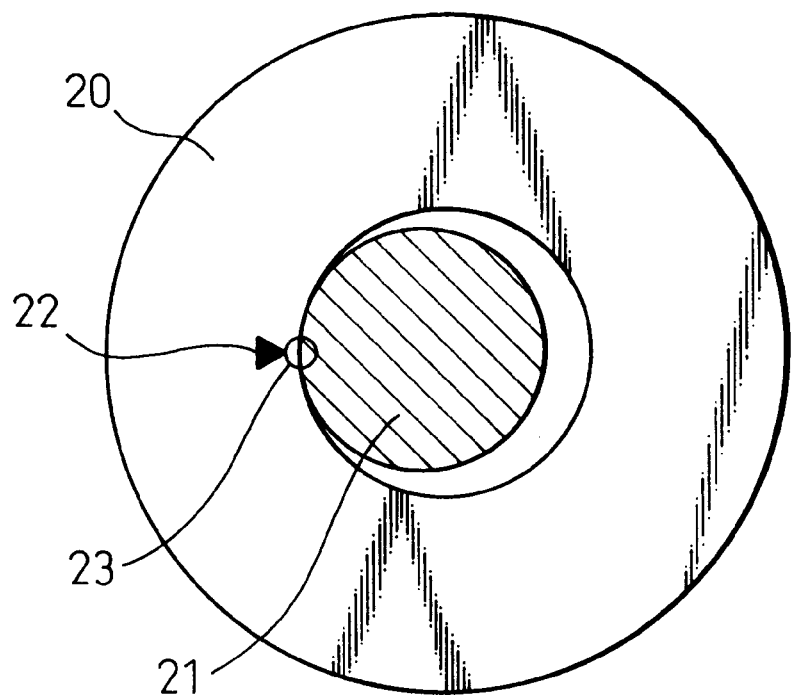
FIG. 1(a) is a plan view illustrating a first embodiment of this invention and FIG. 1(b) is a cross-sectional view of a modification of the first embodiment.

Referring now to the drawings, wherein FIG. 1(a) is a schematic illustration of a first embodiment of the present invention. In FIG. 1(a), there are shown are a disk medium 20, a spindle hub 21, a reference marker 22 and a contact portion 23 between the spindle hub 21 and the disk medium 2.

For example, regarding both the outer diameter of a spindle hub which is used for servo track writing (STW) operation and the outer diameter of a spindle hub 21 which is incorporated into a disk drive, the tolerance is 5 $\mu$m, a part on a medium surface of the disk medium 20 is provided with a reference marker 22, the position of the reference marker 22 is detected by an optical sensor (for example, a reflection amount of a reflected light is determined when a light is irradiated). The disk medium 20 is incorporated into the spindle hub 21 in such a manner that the reference marker 22 provided on the inner peripheral edge comes into contact with the spindle hub 21 (at 23). In this manner, in the both occasions, when the STW operation is performed and when the disk medium is incorporated into a disk drive, the inner peripheral edge is in contact with the outer diametrical portion or periphery of the spindle hub 21 (at 23). Thus, the deviation between the rotation center of the disk medium when the STW operation is performed and the rotation center of the disk medium when the recording medium is incorporated into the disk drive is within the difference in outer dimensions of the spindle hub 21, i.e., within the tolerance of the dimension, which can be limited to within 5 $\mu$m.

Figure 1B:
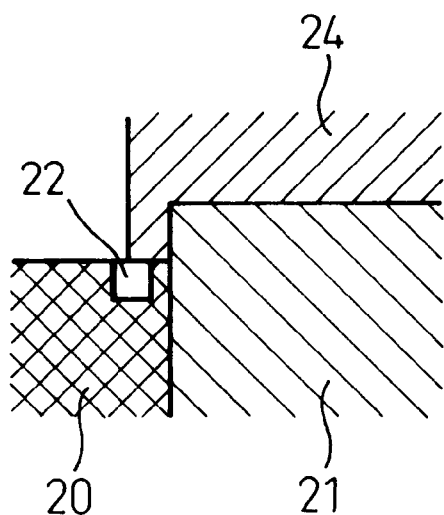

FIG. 1(b) is a cross-sectional view of a modification of the first embodiment (corresponding to 1b, 2-1b, 2, 3a, 3b cross-section in FIG. 6), wherein reference numeral 24 denotes a clamper.

If the recording capacity of the disk medium is to be increased, the data zone of the disk medium should be divided into several zones in such a manner that there are a plurality of tracks in the respective zone and the bit length is changed for the respective zone, usually referred to as "ZBR (Zone Bit Recording)". In this case, if the outer diametrical or peripheral area of the disk medium 20 is used, the zone where the bit length is short can be increased and the recording density of that zone can be increased. On the other hand, if a system in which the head slider is in contact with the disk medium when the rotation of the disk medium is stopped, usually referred to as "CSS (Contact Start Stop)", is employed, the CSS zone is in the inner diametrical or peripheral portion of the disk medium in many cases, since the contact portion cannot be used as a data zone. In this case, if the recording capacity is to be increased, the position of the reference marker 22 should be in the vicinity of the clamping position by the clamper 24 of the inner peripheral portion.

Although, in the first embodiment, the number of the reference marker 22 is one which is at the side of the contact portion, a plurality of such reference markers 22 can be provided. Also, in the above embodiment, the position of the reference marker 22 is shown as on a surface passing through the contact portion 23 and the rotation axis of the spindle hub 21. However, if there is any reason, for example, when the disk medium is in contact with the spindle hub, that the detecting operation of the position of the reference marker 22 by a sensor (not shown) is disturbed by any disk holding means (not shown), the position of the reference marker 22 can be shifted by a certain distance, provided that the relationship of positions is identical for both the spindle which is used when the STW is performed and the spindle which is used when the disk medium is incorporated into the disk drive.

If a data surface servo system is employed, in which servo track information is written for all of the disk media 20 before such a plurality of disk media 20 is stacked in the disk drive, it would be better to complete the servo track writing (STW) operation for the respective surfaces of the disk media, once the disk media have been incorporated into the spindle for the STW operation. Thus, when the disk media are incorporated into the disk drive, the deviations of the servo track information in the respective surfaces of the disk media can be identical for all of the disk media.

In a system in which a servo pattern magnetic film is used for recording the servo track information, when the magnetic film is formed, the center point of the disk is positioned with respect to a holder for holding the disk. The above mentioned first embodiment can also be applied to this case, if the contact portion between the holder and the inner periphery of the disk medium is set in the same conditions as mentioned above. Although the explanations for the servo pattern magnetic film is omitted in the embodiments as mentioned hereinafter, these embodiments can also be applied in the same manner as the first embodiment.

Figure 2:
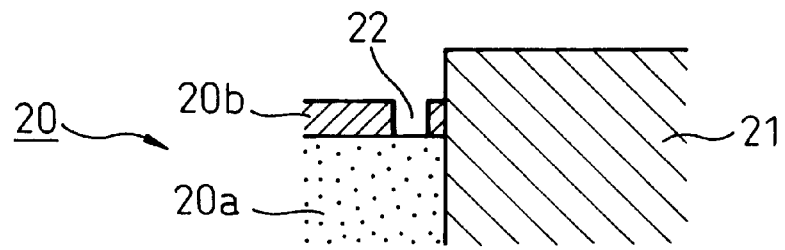
FIG. 2 is a cross-sectional view of a second embodiment of this invention.
Figure 6:
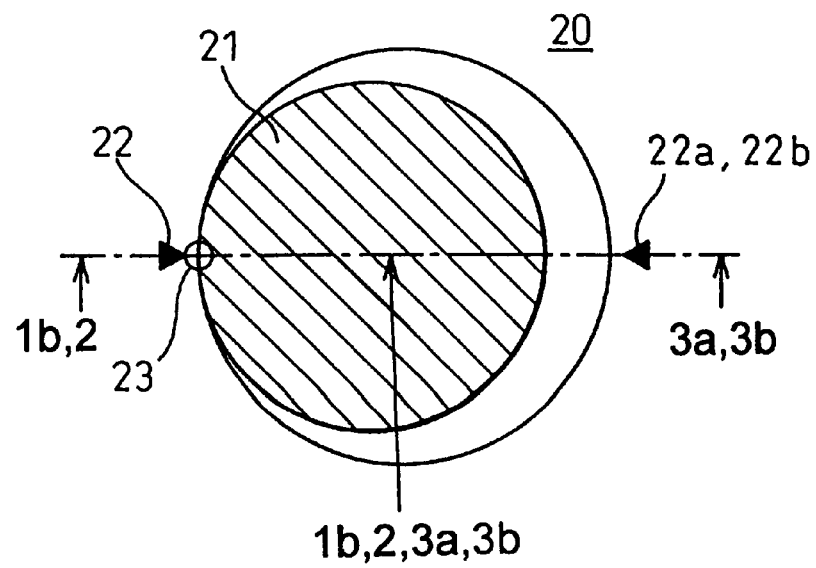
FIG. 6 is a plan view illustrating positions of the respective embodiments.

FIG. 2 is a cross-sectional view of a second embodiment of this invention (corresponding to a section A–B in FIG. 6). When a medium 20b is formed on a disk substrate 20a, a part of the disk substrate 20a is masked so that such a part is prevented from being covered with the medium 20b, so that the part is used as a reference marker 22 for distinguishing it from the other part. In practice, the following method can be employed as a masking method. The shape of a disk clamp (not shown) which is used when a medium 20b is formed on a disk substrate 20a is partially changed in such a manner that a part of the disk substrate 20a is masked.

Figure 3A:
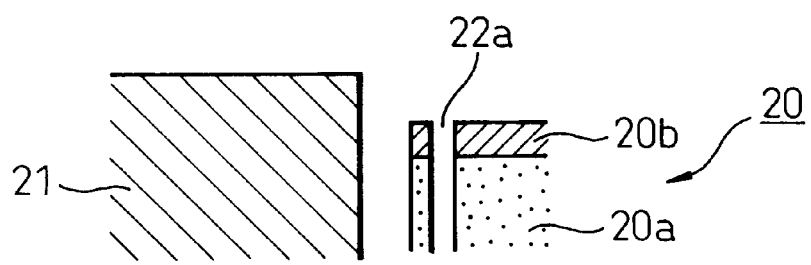
Figure 3B:
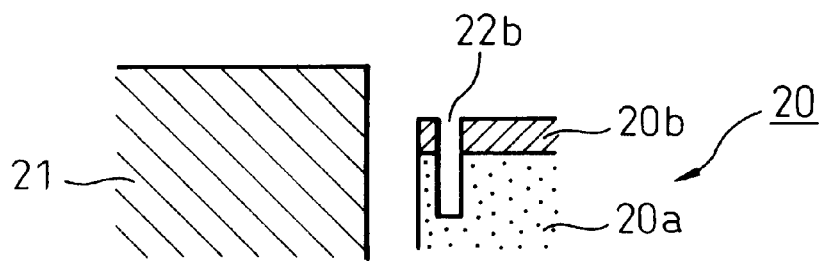

FIGS. 3(a) and 3(b) are cross-sectional views of a third embodiment of this invention (corresponding to a section 1b, 2, 3b–3a, 3b in FIG. 6), wherein FIG. 3(a) shows an example providing with an aperture and FIG. 3(b) shows an example providing with a groove.

As seen in the drawings, the disk medium 20 is provided with an aperture 22a a groove 22b which is used as a reference marker 22. The position of the aperture 22a or the groove 22b and the size of the aperture 22a or the depth of the groove 22b can be selected to suitably balance the weight of the disk medium 20. In this case, it is most effective that the reference marker 22 (the aperture 22a or groove 22b) is arranged at a position symmetrical to the contact position, with respect to the rotation axis as shown. That is, in this case, the position of the reference marker 22 is the farthest position from the hub 21.

Figure 4:
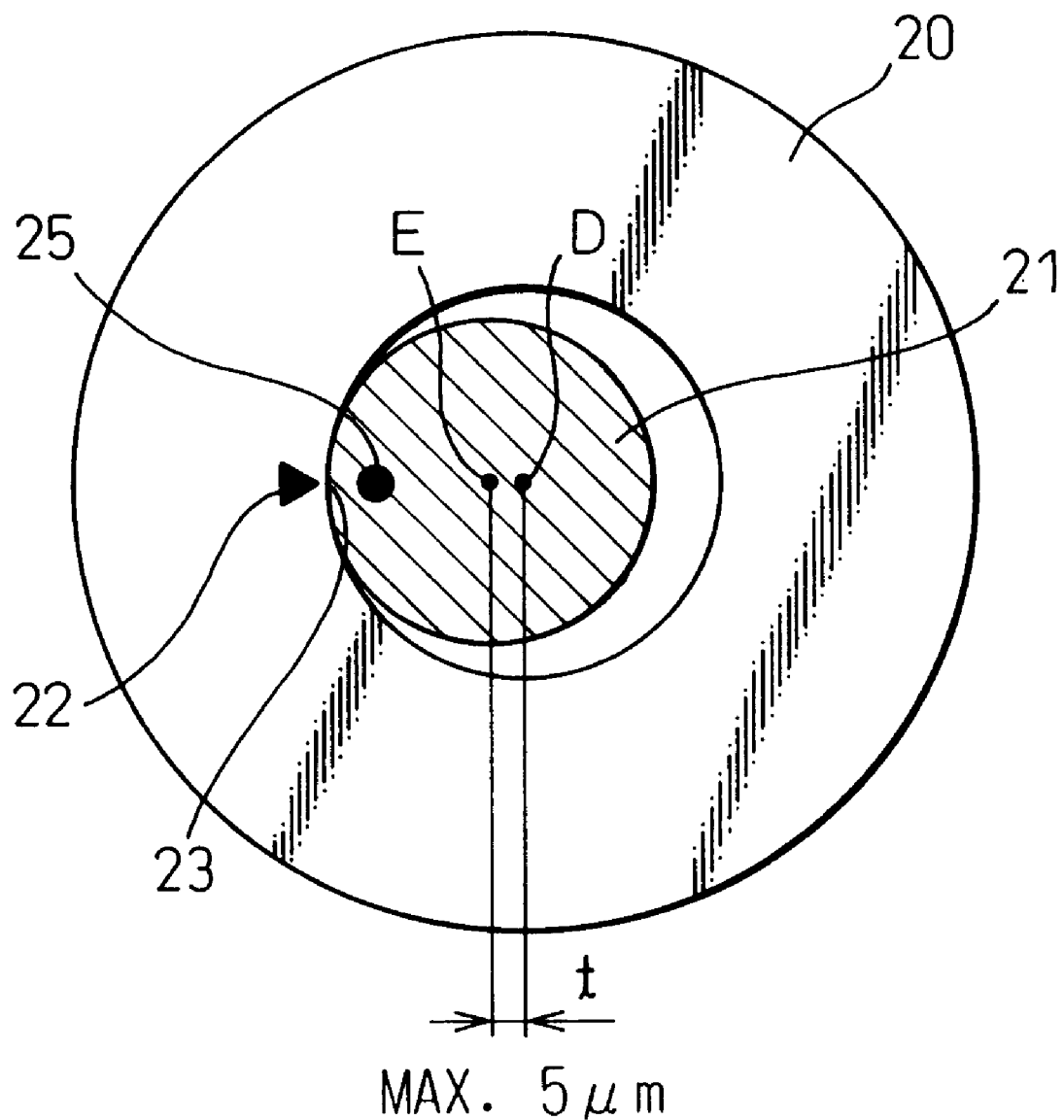
FIG. 4 is a plan view of a fourth embodiment of this invention.

FIG. 4 is a plan view of a fourth embodiment. According to this disk medium incorporating method, the gravity center D and the rotation center E of the disk medium 20 are not identical, but the gravity center D of the rotational body is intentionally deviated from the axis E of rotation center thereof by a certain distance t. Therefore, the deviation distance t can easily be determined and therefore a balance control can easily be attained beforehand.

In order to attain such a balance control on the spindle hub 21, any appropriate method can be applied, such as the spindle hub 21 being machined so as to increase or reduce the weight thereof, or an appropriate weight being added to the spindle hub 21. For example, if a 2.5-inch glass disk substrate having a specific gravity of 2.5 (the dimension thereof: the outer diameter is 65 mm, the inner diameter is 20 mm and the thickness t is 0.635 mm) is incorporated in the same manner as the first embodiment, the deviation of the gravity center D from the axis E of rotation center is 5 $\mu$m at maximum in a direction symmetrical to the contact position with respect to the rotation axis E and therefore the amount of imbalance is presumed to be 0.0235 g·mm at maximum. If the spindle hub is made of an iron metal (specific gravity: 7.9), a projection or weight 25 having a diameter of 1 mm and a height of 0.5 mm is arranged at a position of R 8 mm in the side of the contact position 23 on a surface passing through the contact position 23 and the axis E of rotation. Otherwise, an aperture having a diameter of 1.3 mm is arranged at a position of R 8 mm symmetrical to the contact position 23 with respect to the axis E of rotation. If the disk substrate 20 is provided with an aperture in the same manner as the third embodiment, a through hole having a diameter of 1 mm and a depth of 3 mm can be arranged at a position of R 11 mm in the opposite side to the contact position 23 with respect to the axis E of rotation, thereby a balance control can be attained.

If a plurality of disk media 20 are stacked, a balance control can be attained by the following manner. The position at which the inner periphery of the disk medium comes into contact with the outer periphery of the spindle hub is changed alternately one by one at positions symmetrically with respect to the axis E of rotation. Otherwise, the contact position is changed by a certain angle, one after another, for the respective disks. However, in a case of the data surface servo system, the servo track writing (STW) must be performed individually for the groups of disks in which the contact position is changed for the respective groups.

Figure 5:
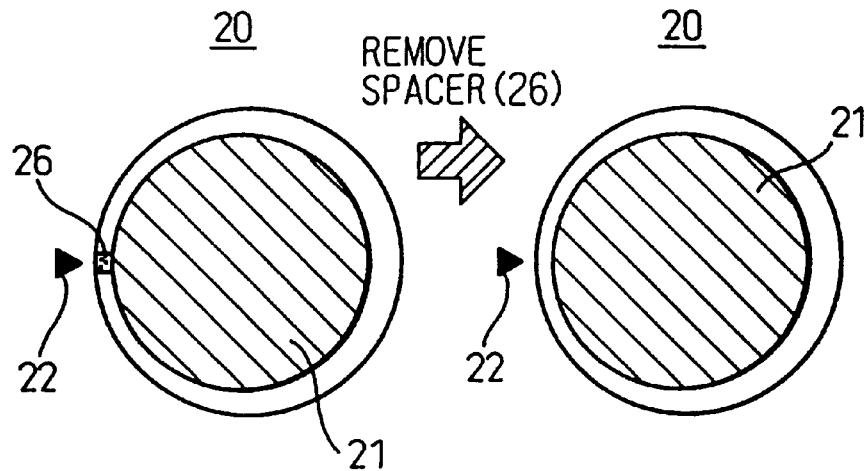
FIG. 5 is a plan view of a fifth embodiment of this invention.

FIG. 5 is a plan view of a fifth embodiment.

If the material of the disk medium 20 is different from that of the spindle hub 21 and if the disk medium 20 is incorporated into the STW apparatus and also into the disk drive in such a manner that the inner periphery of the disk medium 20 is brought into contact with the outer periphery of the spindle hub 21, the contact portion may be subjected to a thermal stress due to the difference in coefficients of thermal expansion therebetween and, thus, the disk medium 20 may be deviated to an extent in which there may be a possibility that a head cannot follow the disk medium 20. This can be avoided by a fact that an abutting position between the inner peripheral edge of the disk medium 20 and the outer periphery of the spindle hub 21 is deviated by a certain gap in the diametrical direction. One of the methods for providing such a gap therebetween is using a spacer 26 which is inserted between the inner peripheral edge of the disk medium 20 and the outer periphery of the spindle hub 21, before they are abutted to each other, and then the spacer 26 is removed after the disk medium 20 is incorporated. It is necessary, however, that the same spacer 26 be used for both when the servo track information is written and when the disk medium 20 is incorporated into the disk drive.

FIG. 6 shows respective positions of reference marker 22 (22a, 22b) in cross-section in the previous embodiments, particularly the embodiments shown in FIG. 1(b), FIG. 2, FIG. 3(a) and FIG. 3(b).

Figure 7A:
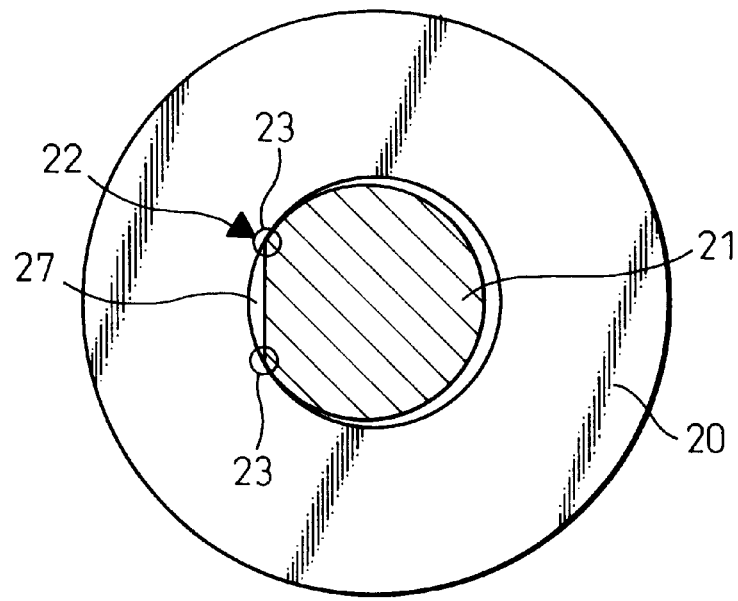
Figure 7B:
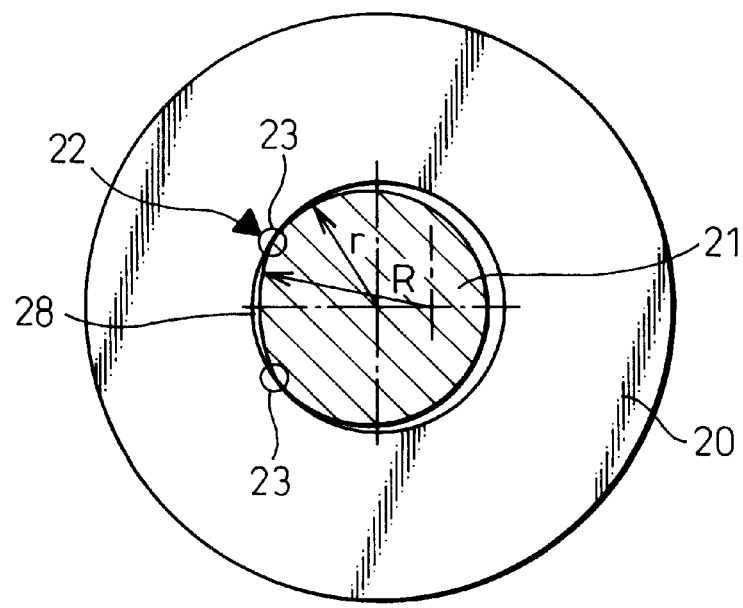

FIGS. 7(a) and 7(b) show sixth embodiments of this invention, in which the circular cross-section of the spindle hub can be cut by a straight surface (in FIG. 7(a)), or by a curved face or R (round)-shaped face having a radius (R) larger than the radius of the hub (in FIG. 7(b)).

As previously described, if the material of the disk medium 20 is different from that of the spindle hub 21 and if the disk medium 20 is incorporated into the STW apparatus and also into a disk drive in such a manner that the inner peripheral edge of the disk medium 20 comes into contact with the outer periphery of the spindle hub 21, the contact portion is subjected to a thermal stress due to the difference in coefficients of thermal expansion therebetween, so that the head may not follow to an aimed track on the disk medium 20. In this embodiment, the circular cross-section of the spindle hub is provided with a cut portion 27 which cut by a straight line, i.e., a cord of the circular cross-section, or by a curved or R-shaped face having a radius (R) which is larger than the radius (r) of the hub. Thus, there are two contact positions 23 between the inner peripheral edge of the disk medium 20 and the outer periphery of the spindle hub 21, so that the disk medium 20 can easily and stably be positioned with respect to the spindle hub 21 and the difference in coefficients of thermal expansion therebetween can be absorbed to avoid any deviation of the disk medium 20. In this embodiment, although the reference marker is not illustrated in the drawings, the position of the reference marker of the disk medium 20 may either be one of these two contact positions 23 or a central position between these two contact positions 23.

FIGS. 8(a) to 8(d) show a seventh embodiment of this invention. In this embodiment, a spacer member 29 is used in the abutting portion between the inner periphery of the disk medium 20 and the outer periphery of the hub 21 in the same manner as the fifth embodiment (see FIG. 5). However, the spacer member 29 of this embodiment has two spacer elements 26 spaced in the circumferential direction, as shown in FIG. 5(a).

Figure 8A:
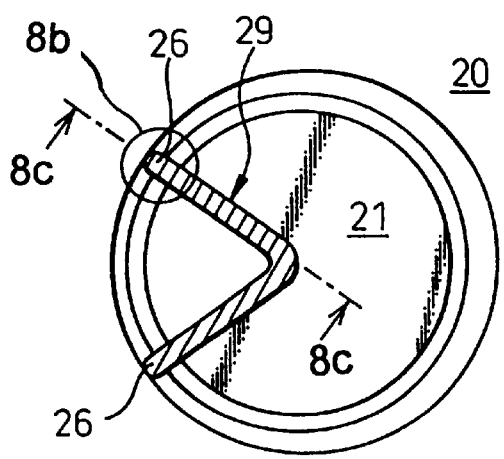
Figure 8B:
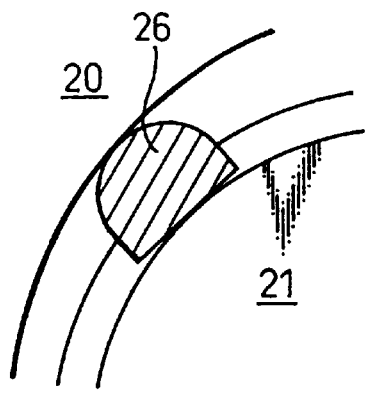

FIG. 8(b) is an enlarged cross-sectional view of the spacer element 26 along a horizontal surface at the portion indicated by 8b in FIG. 8(a). It is preferable that, as illustrated, the spacer 26 have a semi-circular horizontal cross-section, in which the straight side thereof is in contact with the outer periphery of the hub 21 and the semi-circular side is in contact with the inner periphery of the disk medium 20.

Figure 8C:
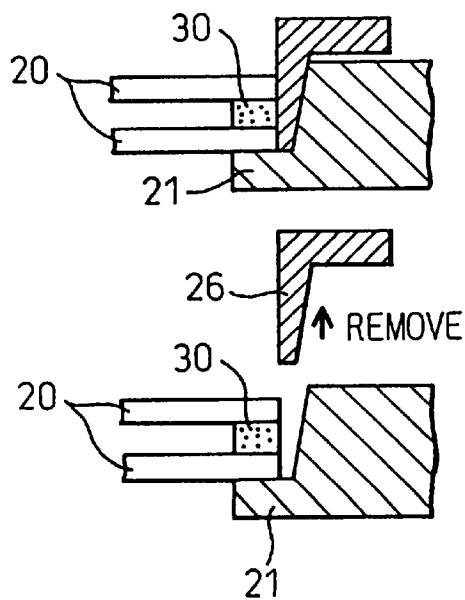

FIG. 8(c) shows two cross-sections taken along line 8c—8c in FIG. 8(a), illustrating a state of positioning using a spacer element 26 and a state after the spacer element 26 is removed, respectively. The portion of the spacer element 26 which comes into contact with the spindle hub 21 is tapered so that the spacer element 26 can easily be removed from the spindle hub 21. Therefore, in this embodiment, the inner periphery of the disk medium 20 is abutted with the outer periphery of the spindle hub 21 by means of the two spacer elements 26 so that the disk medium 20 can be positioned. After the spacer elements 26 are removed, the disk medium 20 is secured to the spindle hub 21 by means of a clamper (not shown) or any other suitable means. In the same manner as the previous embodiments, the position of the reference marker 22 of the disk medium 20 may either be one of these two positions of the spacer elements 26 or a central position between these two spacer elements 26.

FIG. 8(c) shows, not a single disk medium, but a stacked disk media 20 comprising a plurality of (two) disk media 20 which are stacked by means of a disk spacer 30. The stacked disk media 20 are subjected to a servo track writing (STW) and after STW the stacked disk media 20 are incorporated in their stacked state into the disk drive. In this case, the same tapered spacers 26 can be used to incorporate the stacked disk media 20 into the spindle hub of the STW apparatus, as well as into the spindle hub of the disk drive, respectively.

Figure 8D:
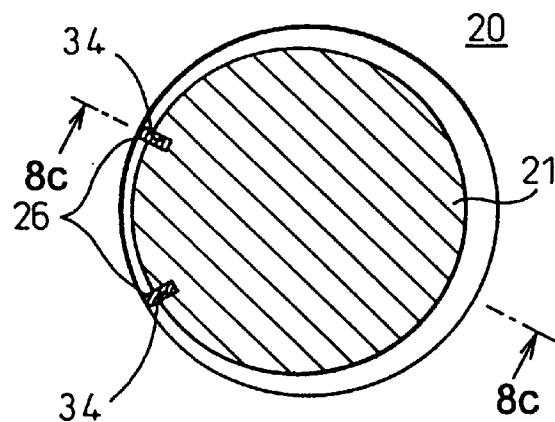

FIG. 8(d) shows an example in which the spindle hub has a pair of grooves 34 to which the spacer elements 26 are inserted, respectively, so that the spacer elements 26 can be positioned. In the same manner as FIG. 8(c), the grooves 34 of the hub and the spacer elements 26 are mutually tapered so that the spacer elements 26 can easily be removed from the grooves 34 of the spindle hub 21.

Figure 9A:
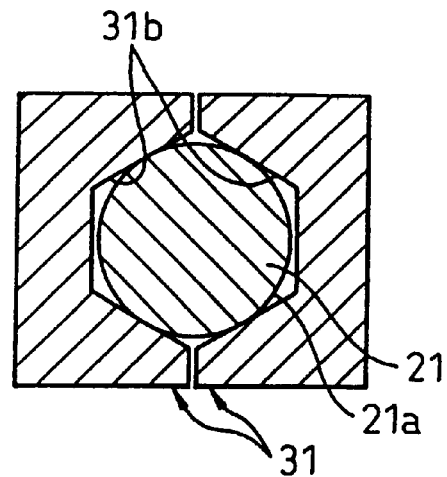
Figure 9B:
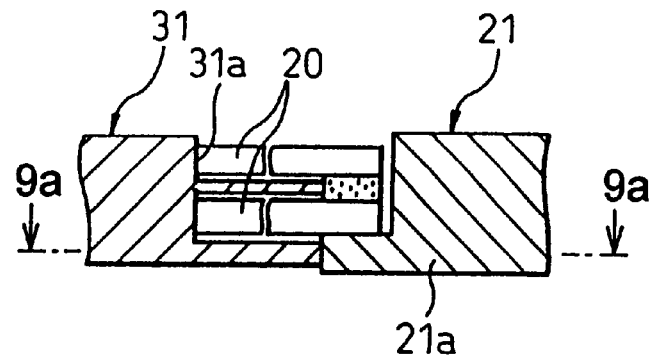

FIGS. 9(a) and 9(b) show an eighth embodiment of this invention. Although, in all of the previous embodiments, the inner periphery of the disk medium 20 is abutted to the outer periphery of the spindle hub 21 to position the disk medium 20, in this embodiment, the outer periphery of the disk medium 20 is used to position the disk medium 20. Each of two divided positioning chucking members 31 comprises a portion 31a which comes into contact with the outer periphery of the disk medium 20 and a portion 31b which comes into contact with a flange portion 21a of the spindle hub 21.

The disk medium 20 is placed on the flange portion 21a of the spindle hub 21, the two chucking members 31 are brought into contact with the respective sides of the disk medium 20, and the chucking members 31 are moved radially inward until the portions 31b come into contact with the outer periphery of the disk medium 20 while the portions of the chucking members 31 are in contact with the outer periphery of the disk medium 20. Since the flange portion 21a of the hub 21 and the portions 31a and 31b of the chucking members 31 are precisely machined, the disk medium 20 can be positioned with respect to the spindle hub 21 on the basis of its outer periphery.

Figure 10:
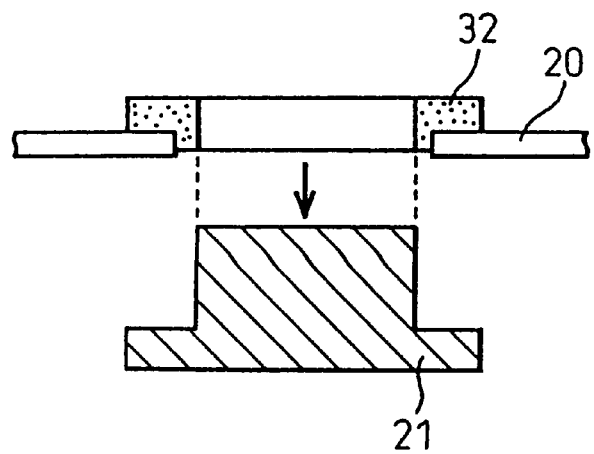
FIG. 10 is a cross-sectional view of a ninth embodiment of this invention.
Figure 12A:
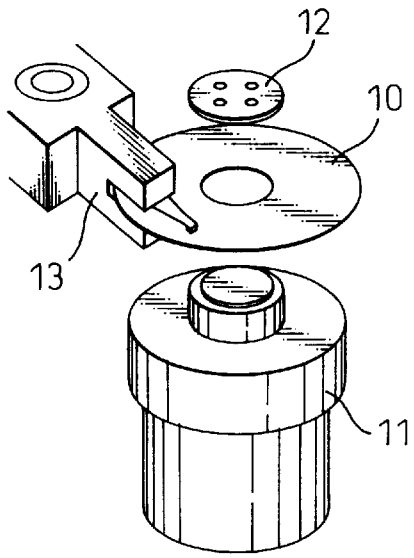
FIGS. 12(a) and 12(b) are schematic illustrations of a conventional method for writing servo track information.
Figure 12B:
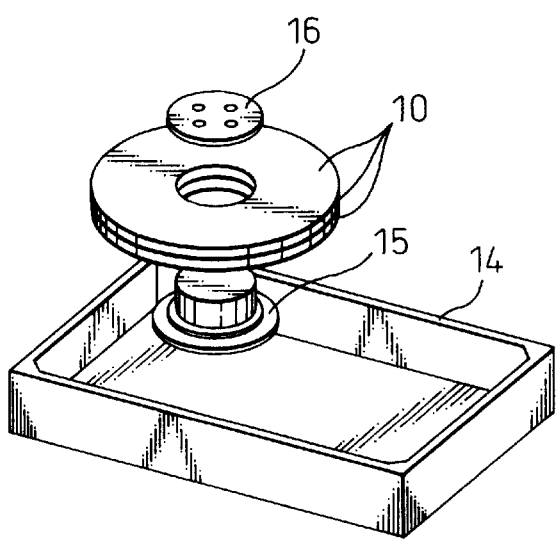
Figure 13:
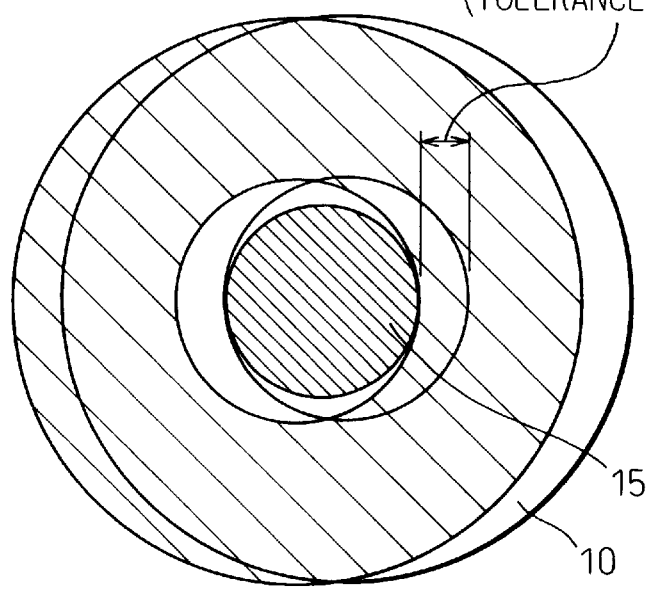
FIG. 13 is schematic illustration for explaining a problem which occurs when a disk medium is incorporated into a disk drive.

FIG. 10 shows a ninth embodiment of this invention. In this embodiment, a ring-shaped member 32 which also serves as a spacer between disks and has an inner diameter which is precisely fitted with the spindle hub 21 is used. Before a servo track information is written on the disk medium 20 (STW), the member 32 is accurately positioned so as be in contact with the inner peripheral portion of the disk medium 20. Then, when the servo track writing (STW) is performed, the member 32 is fitted with the hub 21 of the STW apparatus, and the disk medium is subjected to STW for individual disk medium 20. After STW, the disk medium 20 is incorporated into the spindle hub of the disk drive. In this case, if a plurality of disk media 20 are to be stacked, this member 32 defines by itself a gap between the adjacent disk media 20. In the embodiment of FIG. 10, it is not necessary to provide a reference marker as the previous embodiments.

It should be understood by those skilled in the art that the foregoing description relates to some preferred embodiment of the disclosed invention, and that various changes and modifications may be made to the invention without departing from the spirit and scope thereof.

We claim:

1. A method for incorporating a disk medium into a magnetic disk drive after a servo track information has been written onto the disk medium for positioning a head of the magnetic disk drive at an aimed track in the disk medium, said method comprising the steps of:

providing a reference marker as a positioning reference on a part of said disk medium;

incorporating said disk medium into a servo track writing (STW) apparatus so that STW is performed on said disk medium;

determining a distance from an axis of center of rotation of said disk medium to said reference marker in said STW apparatus; and incorporating said disk medium into said magnetic disk drive in such a manner that said distance from said axis of rotation center of said disk medium to said reference marker is the same as when said STW was performed on said disk medium; and incorporating said disk medium into said STW apparatus and also into said magnetic disk drive including a step of placing an inner periphery of said disk medium in contact with a respective outer periphery of a spindle hub of said magnetic disk drive and a spindle hub of said STW apparatus, including forming said distance from said axis of rotation center of said disk medium to said reference marker to be the same in both said STW apparatus and in said magnetic disk drive.

2. A method as set forth in claim 1, wherein at least one surface of the disk medium is almost entirely coated with medium material except for a part of said one surface of the disk medium, so that said part on said one surface which is distinct from the other area on said one surface is defined as said reference marker.

3. A method as set forth in claim 1, wherein said disk medium is provided with an aperture or a groove which is defined as said reference marker.

4. A method as set forth in claim 1, further comprising a step of adding weight for balancing said spindle hub of said magnetic disk drive to or removed from said spindle hub along a line on a surface of said spindle hub passing through a contact position of said spindle hub of said magnetic disk drive and said disk medium and a rotation axis of said magnetic disk.

5. A method as set forth in claim 1 wherein said respective spindle hubs of both said STW apparatus and said magnetic disk drive have same circular cross-sections, said respective circular cross-sections are cut by straight lines or curves having a radius larger than a radius of said circular cross-sections to form cut portions, said disk medium is incorporated into said STW apparatus and also into said magnetic disk drive in such a manner that an inner periphery of said disk medium comes into contact with respective outer peripheries of said spindle hubs at two positions corresponding to respective ends of said cut portions.

6. A method as set forth in claim 1, wherein both said STW apparatus and said magnetic disk drive have respective spindle hubs, said disk medium is incorporated into said STW apparatus and also into said magnetic disk drive in such a manner that an inner periphery of said disk medium comes into contact with respective outer peripheries of said spindle hubs by means of a spacer, so that the distance from an axis of rotation center of said disk medium to said reference marker is the same in both said STW apparatus and said magnetic disk drive.

7. A method as set forth in claim 6, wherein a balance weight is added to or removed from said disk medium at a position on a surface passing through a contact position with respect to said respective spindle hubs and a rotation axis of said spindle hub.

8. A method as set forth in claim 6, wherein said inner periphery of the disk medium comes into contact with respective outer peripheries of said spindle hubs by means of two spacers spaced in the circumferential direction.

9. A method as set forth in claim 6, wherein, after said inner periphery of the disk medium comes into contact with respective outer peripheries of said spindle hubs by means of said spacer so that said disk medium is positioned, said spacer is removed in axial directions of said spindle hubs and then said disk medium is secured to said spindle hubs by means of clamp means.

10. A method as set forth in claim 9, wherein contact surfaces between said spacer and said spindle hubs are tapered so that said spacer can easily be removed in axial directions of said spindle hubs.

11. A method as set forth in claim 1, wherein both said STW apparatus and said magnetic disk drive have respective spindle hubs, said disk medium is incorporated into said STW apparatus and also into said magnetic disk drive in such a manner that an outer periphery of said disk medium comes into contact with a jig member which has a portion in contact with said respective outer peripheries of said spindle hubs, so that the distance from an axis of rotation center of said disk medium to said reference marker is the same for both in said STW apparatus and in said magnetic disk drive.

12. A method for incorporating a disk medium into a magnetic disk drive after a servo track information has been written onto the disk medium for positioning a head of the magnetic disk drive at an aimed track in the disk medium:

providing a spacer having an inner diameter which can be fitted to spindle hubs of both a servo track writing (STW) apparatus and said magnetic disk drive and defining a gap between an adjacent disk medium;

attaching said spacer to an inner peripheral edge of said disk medium; and attaching said spacer to said spindle hub so that said inner diameter of the spacer is fitted to an outer diameter of said spindle hub, in such a manner that the position of said disk medium with respect to said spindle hub is the same when said disk medium is incorporated into said STW apparatus and into said magnetic disk drive.

13. A method for incorporating a plurality of stacked disk media into a magnetic disk drive after a servo track information has been written onto said plurality of stacked disk media for positioning heads of the magnetic disk drive at aimed tracks in the disk media, said method comprising the steps of:

providing a reference marker as a positioning reference on a part of at least one of said plurality of stacked disk media;

incorporating said stacked disk media into a servo track writing (STW) apparatus so that STW is performed on said disk media;

determining a distance from an axis of center of rotation of said disk media to said reference marker in said STW apparatus;

incorporating said stacked disk media into said magnetic disk drive in such a manner that said distance from said axis of rotation center of said disk media to said reference marker is the same as when said STW was performed on said disk media; and incorporating said disk medium into said STW apparatus and also into said magnetic disk drive including a step of placing an inner periphery of said disk medium in contact with respective outer peripheries of a spindle hub of said magnetic disk drive and a spindle hub of said STW apparatus, including forming said distance from said axis of rotation center of said disk medium to said reference marker to be the same in both said STW apparatus and in said magnetic disk drive.

14. A method as set forth in claim 13 wherein both said STW apparatus and said magnetic disk drive have respective spindle hubs, said stacked disk media are incorporated into said STW apparatus and also into said magnetic disk drive in such a manner that inner peripheries of said stacked disk media come into contact with respective outer peripheries of said spindle hubs by means of two spacers spaced in the circumferential direction.

15. A method as set forth in claim 14, wherein, after-said inner peripheries of the stacked disk media come into contact with respective outer peripheries of said spindle hubs by means of said two spacers so that said stacked disk media are positioned, said spacers are removed in axial directions of said spindle hubs and then said stacked disk media are secured to said spindle hubs by means of clamp means.

16. A method as set forth in claim 15, wherein contact surfaces between said spacers and said spindle hubs are tapered so that said spacers can easily be removed in axial directions of said spindle hubs.

17. The method according to claim 1, wherein said step of placing said inner periphery of said disk medium in contact with said outer periphery of said spindle hub of said STW or said magnetic disk drive further includes placing said inner periphery of said magnetic disk in direct contact with a generally circular periphery of said spindle hubs so that the center of said spindle hubs and the center of said inner periphery of said magnetic disk are not located at the same point.

18. The method according to claim 13, wherein said step of placing said inner periphery of said disk medium in contact with said outer periphery of said spindle hub of said STW or said magnetic disk drive further includes placing said inner periphery of said magnetic disk in direct contact with a generally circular periphery of said spindle hub so that the center of said spindle hub and the center of said inner periphery of said magnetic disk are not located at the same point.

* * * * *